G. BAUM.
PROCESS FOR DISTILLING SULPHURIC ACID.
APPLICATION FILED JUNE 11, 1921.
1,419,008. Patented June 6, 1922.
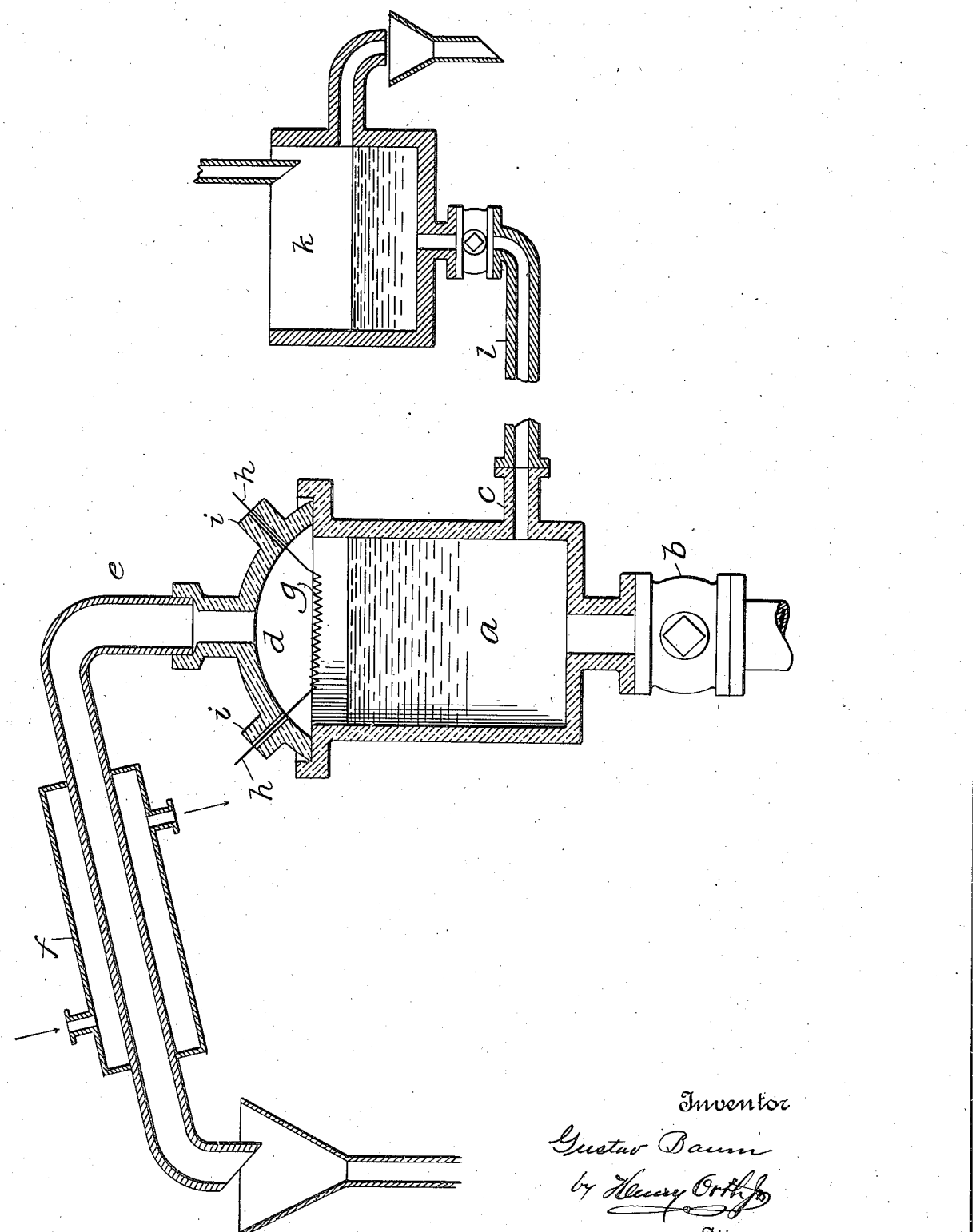

UNITED STATES PATENT OFFICE.

GUSTAV BAUM, OF CARINTHIA, AUSTRIA, ASSIGNOR TO THE FIRM CHEMISCHE FABRIK WEISSENSTEIN GESELLSCHAFT M. B. H., OF CARINTHIA, AUSTRIA, A COMPANY OF AUSTRIA.

PROCESS FOR DISTILLING SULPHURIC ACID.

1,419,008.     Specification of Letters Patent.     Patented June 6, 1922.

Application filed June 11, 1921. Serial No. 476,901.

*To all whom it may concern:*

Be it known that I, GUSTAV BAUM, a citizen of the Republic of Austria, and residing at Weissenstein ob der Drau, Carinthia, Austria, have invented certain new and useful Improvements in a Process for Distilling Sulphuric Acid (for which an application for patent was filed in Austria May 21, 1920); and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The distillation of technical sulphuric acid especially for the purpose of producing pure acid has been hitherto a very small scale process since glass retorts and quartz vessels have alone been practicable for the process and these materials do not lend themselves to the construction of large units, being unable to offer any great resistance to mechanical stresses. When the walls of such vessels are thickened for increasing the mechanical resistance, the utilization of heat is poor, and the thermal tension phenomena becomes important.

Cast iron vessels with acid-proof enamel lining, have not found a footing in practice, as the hair-cracks in the enamel expose the material underneath.

Although progress in the manufacture of acid-proof alloys makes it likely that a suitable material will soon be found, only external heating has been used in the operation hitherto. Internal heating by means of superheated steam has not been adopted because, again, of the lack of suitable material.

By the present invention technical sulphuric acid can be distilled to obtain chemically pure acid without any difficulty, by arranging electrical resistances as heating bodies within the apparatus at suitable distance from the surface of the liquid, and heating these resistances by electric current. The top layer of liquid is thus heated by radiation, so that evaporation proceeds only on the surface, and it is not required to heat to boiling temperature the entire quantity of liquid contained in the apparatus. Thus, not only is a better economy of heat attained but also suspended boiling, which is particularly dangerous in the heating of sulphuric acid, is avoided.

Internal heating makes possible the use of any suitable acid proof material for the construction of the acid container. Since the latter is not put under thermal strain, there is wide latitude for thickness of wall; the limit for the unit is thereby substantially extended and the heat consumption still more reduced.

A further advantage of internal heating is that the matter which is always deposited owing to concentration during the distillation of technical sulphuric acid, does not settle on the heated surface, forming incrustations and thus increasing the difficulty of heating and interrupting the work, but collects in loose form on the bottom surface and may easily be removed by suitable devices during the working.

It is a surprising fact that the distillation of technical sulphuric acid by means of internal electric resistance-heating, proceeds without decomposition of the sulphuric acid vapour to $SO_2$ and that in addition to platinum for example, electric conductors which are not acid-proof, such as, for example, nickeline an alloy of copper, nickel and zinc or iron, may be used as heating bodies.

The accompanying drawing illustrates diagrammatically a plant suitable for the process:

$a$ is a cylindrical stoneware pot connected at the bottom with a discharge pipe $b$, and having at its lower part a neck $c$ connected with a pipe $l$ leading from a tank $k$. The pot $a$ carries a dome-shaped cover $d$ and with this is connected a delivery pipe $e$ extending through a suitable condenser $f$. The heating elements $g$ are arranged in the cover, for example all in the same plane, their ends $h$ extending through, and packed in insulating manner in, thickened portions $i$ of the cover. The level of the acid is kept constantly at the same and smallest possible distance from the heating elements, by means of suitable known devices. After the electric current—alternating or continuous current may be used—has been switched on, distillation begins and proceeds quietly without interruption. The distillate collected from the condenser is chemically pure sulphuric acid.

When iron, for instance in the form of helices, is used for heating bodies the metal becomes coated with a thin layer of iron oxide and iron sulphate which prevents further attack on the metal and checks the decomposition of the $H_2SO_4$ vapour, which occurs in contact with glowing iron helices. For the concentration of the heat radiation on the surface of the liquid it is a suitable practice to place reflectors, for example quartz reflectors of semi-circular cross section, over the upper half of the heating bodies.

Now what I claim is—

1. The process of distilling sulphuric acid, which comprises heating a body of the acid from an incandescent source of radiant heat above the surface of the acid.

2. The process of distilling sulphuric acid, which comprises heating a body of the acid in an inclosed acid-proof chamber by incandescent electrical heating bodies above the surface of the body of acid.

3. The process of distilling sulphuric acid, which comprises heating a body of acid in an inclined acid-proof chamber by incandescent electrical heating elements of non-acid-proof material above the surface of the acid body.

4. The process of distilling sulphuric acid, which comprises heating a body of the acid in an inclosed acid-proof chamber having a dome-shaped top reflector, by heat radiated from electrical heating means between the acid surface and reflector and augmented by reflected heat, while maintaining a constant acid level below the source of heat.

5. The process of distilling sulphuric acid, which comprises radiating heat onto the surface of a body of acid contained in a closed chamber from a metallic electrical resistance heating element protected against the action of said acid by a coating of the reaction product of said metal and acid.

In testimony that I claim the foregoing as my invention, I have signed my name.

Dr. GUSTAV BAUM.